US008731986B2

(12) United States Patent
    Angelica (10) Patent No.: US 8,731,986 B2
(45) Date of Patent: May 20, 2014

(54) MODULATED CASCADING ELECTRONIC MESSAGING NETWORK

(76) Inventor: Steve Angelica, West Hollywood, CA (US)

( * ) Notice: Subject to any disclaimer, the term of this patent is extended or adjusted under 35 U.S.C. 154(b) by 2265 days.

(21) Appl. No.: 11/184,595

(22) Filed: Jul. 19, 2005

(65) Prior Publication Data

US 2006/0015564 A1    Jan. 19, 2006

Related U.S. Application Data

(60) Provisional application No. 60/589,244, filed on Jul. 19, 2004.

(51) Int. Cl.
    *G06Q 10/00* (2012.01)
(52) U.S. Cl.
    USPC ........................................ 705/7.12
(58) Field of Classification Search
    USPC ............................. 705/12, 10, 7.12
    See application file for complete search history.

(56) References Cited

U.S. PATENT DOCUMENTS

| 6,311,211 | B1 | 10/2001 | Shaw et al. |
| 6,457,045 | B1 | 9/2002 | Hanson et al. |
| 6,549,950 | B2 | 4/2003 | Lytle et al. |
| 6,604,132 | B1 * | 8/2003 | Hitt ................................ 709/206 |
| 6,643,681 | B1 | 11/2003 | Saito et al. |
| 6,915,332 | B1 | 7/2005 | Zdepski |
| 6,915,334 | B1 | 7/2005 | Hall |
| 7,422,150 | B2 * | 9/2008 | Chung ........................... 235/386 |
| 2001/0037234 | A1 * | 11/2001 | Parmasad et al. ................ 705/12 |
| 2003/0023478 | A1 * | 1/2003 | Piccionelli ........................ 705/12 |
| 2003/0212592 | A1 * | 11/2003 | Murray ............................ 705/12 |
| 2004/0064511 | A1 | 4/2004 | Abdel-Aziz et al. |
| 2006/0081706 | A1 * | 4/2006 | Onischuk ....................... 235/386 |

* cited by examiner

*Primary Examiner* — Romain Jeanty (57) ABSTRACT

A method is disclosed for co-ordinating the sending of electronic messages in such a way that a positive feedback loop is created. This is achieved by linking the messages to a form with inputs configured to facilitate submission of a greater multiple of additional addressee entries than with other known methods. Subsequent messages are optionally sent out by the submitters themselves to increase effectiveness of delivery. Financial and other incentives are proposed to motivate participants to provide inputs. The cascading chain reaction effect is modulated by the interposition of a central control server which formats the outgoing messages and extracts from them any addressees thought to have already been sent a particular periodic message, or which represent opt-outs. The control server may itself add extra addressee entries from stored databases to the outgoing messages of participants sent by them with their consent, further supporting the effect. A method of synthesizing messages with parallel meaning is included. A referendum method is also demonstrated where voters initiate the transmission of their opinions to multiple government, media or business leaders in a one click process. Capability is also provided for the participants to influence the questions themselves at issue by the referendum. Security methods are disclosed to ensure the integrity of the referendum count.

20 Claims, 3 Drawing Sheets

FIG. 1

The People's Email Network
"the difference between an opinion and one that counts is your vote"

The People's Email Network exists to give you an avenue to better communicate with your legislative representatives. We take no political position on any of the questions presented. That is your responsibility as a citizen. All aspects of this website, including the next question to be considered, are driven solely by your participation. Approximately once a week you will have an opportunity to speak out on a new issue of national importance. Help us spread the word about this resource to everyone you know.   Privacy   Remove me   Opt-in   FAQ   Terms & conditions 102  104  106  108

110 — The current question for you to help decide:

In the next 6 months should U.S. troop levels in Iraq
○ stay the same,   ○ increase, or   ○ decrease?

134 — My senators: (auto lookup)   136
138 ☑ [from zip code and address]   140
116
☑ [from zip code and address]

Email: [____] 118    Mr. ▼   First name: [____] 120    My house representative: (auto lookup)
112   Zip code: [__]-[__]   114   Last name: [____]    ☑ [from zip code and address]

Most members of congress will not accept an email without a street address. Some require a phone number. This information is not transmitted in messages sent to any additional "friends" emails.

142  Send a link to this website to all my friends at these other email addresses:   144

Address: [____]   City: [____]   State: [▼]
122 — Clear zip code and address fields   Phone: [____]   124   126

[paste any text with emails]   146

Add your own personal message to your senators and house representative: 128

130 [                                      ]

148
☑ Yes, I will accept extra CCs
Import email text file:   Clear Friends   152
[____] Browse...

150  Your message will be sent directly through the email gateway pages of your respective members of congress. Emails sending links will be formatted separately. Attachments are strictly not allowed.   154

This is an important section. Your members of congress want to know what you think. All comments should be appropriately respectful and in acceptable taste. The way to have maximum impact is by sending copies of your message to as many of your fellow constituents as possible and encourage
132   them to make their voices heard also.

Send your emails

Help support the People's Email Network and get a copy of our theme song

156 — Choose our next question: (highlight with mouse)

If the election were today would you vote for Bush, Kerry or Nader?
Should prescription drug reimportation from Canada be allowed?
Should the military draft be reinstituted?
Should the U.S. Constitution be amended to ban gay marriage?

158  This section is where you help select what question will be considered next. Just click on the question you think is most important to highlight it and then

Vote for your choice   160

Click here to propose a new question to be added to the list. It can be either a general issue question or related to a piece of pending legislation.

MODULATED CASCADING ELECTRONIC MESSAGING NETWORK

PRIOR US APPLICATION

This Specification is based on U.S. Provisional Application Ser. No. 60/589,244 filed on Jul. 19, 2004. The inventor claims benefit of Title 35, Section 119 of the U.S. Code based on said provisional application.

A portion of the disclosure of this patent document contains material which is subject to copyright protection. The copyright owner has no objection to the facsimile reproduction by anyone of the patent document or the patent disclosure as it appears in the Patent and Trademark Office Patent file or records, but otherwise reserves all copyrights whatsoever.

BACKGROUND

One of the most conspicuous features of the Internet age is the proliferation of the use of email and other electronic messaging mediums. All computer users who can access the Internet also have the capability of sending and receiving electronic messages and many maintain multiple email addresses for different purposes. Yet, for a commercial enterprise or other organization who wishes to deliver their message by email a great many hurdles have arisen. Precisely because of the minimal expense required to send an email message itself, commercial email solicitation has become a greatly abused vehicle, to which has been attached the pejorative label of "spam."

Certain individuals and organizations have successfully pressured many Internet Service Providers to close the accounts of individuals who send out high volumes of commercial messages, driving most large scale email senders to offshore servers, or to use surreptitiously the resources of servers belonging to other entities who may have left a proxy capability open. Because of the complaints of email address box owners, most email services now provide some kind of message filtering, which it is conceded cannot help but filter out at least some messages which the addressee perhaps would have liked to receive unimpeded. Those filters employ four main strategies.

First, various service agencies now maintain lists of IP addresses which have been associated with unsolicited commercial email senders. These lists are then used to blacklist incoming emails by the email service providers according to their source numerical IP, diverting them to separate junk mail boxes or dropping them entirely. Identified open proxies or other such problem domains which exhibit high volume become the basis of such lists.

Second, many sophisticated algorithms and methods have developed for analyzing the content of email messages looking for patterns which suggest a commercial solicitation. These techniques generally match the body and subject lines of an email against long laundry lists of flag words and expressions, such as "free", the internet domain names of sites listed in outgoing emails, the brand names of various pharmaceuticals, sexual references, etc.

Third, the most common email filters do statistical analysis to glean other clues of the nature of a message like patterns or the presence of various email header entries or html tags, the manifestation on the web of large numbers of emails with identical subject lines or body text passages, and so on. In an ongoing game of cat and mouse the bulk message senders began incorporating strings of nonsense characters, superfluous tags, partial encryptions or even throwaway sections of random words in an attempt at stealth, which the filters now look for as well.

Finally, as a last resort some email service providers offer a brute force option where all email is blocked unless the recipient expressly authorizes the sender as a pre-approved email source address. This has the effect of essentially closing off one's email access to all but known friends.

As a result of all these counter measures, it has become increasingly difficult for even a fully above board enterprise to send out any significant number of email messages in the hopes that a respectable number will actually get through. Even those with meritorious and important political messages can get caught up in this. Unless one can reasonably establish that the email addresses on your list are people who have "opted-in" (given affirmative consent to be recipients even where not required by law) and one is willing to plead one's case from one email service provider to another, the hurdles are growing for any kind of email transmission system emanating from a central point. Ironically, the email service providers themselves may impose a default carte blanche web site policy on their own customers, to solicit them without limits, interpose intrusive advertising screens in the use of their "free" web site, etc.

On the side there have been some preliminary attempts at a peer to peer model. One may have encountered form pages which include one or more input fields for someone to provide email addresses of friends to whom a message will be forwarded. This has been described as viral marketing. Over a period of time it is possible to get the word out about a new product or event in this manner and on a large scale, but none of the demonstrated architectures has the capacity of creating a chain reaction effect overnight.

What separates these word of mouth campaigns in essential principle from actual viruses and worms is that in the latter cases the malicious software simply raids the email address boxes of its unwittingly infected hosts for addressees, and then emails them all en masse at the system level, often masquerading under the email address of the original infected user, rather than acting with disclosure and consent. The result in some cases has been an overload of server resources which is the primary negative of such episodes, where single individuals may receive hundreds of infected messages a day at the peak of such a breakout.

It is respectfully submitted that if a method could provide a more effective means for inputting email addresses (rather than one at a time) by a consenting participant in an email "tell a friend" program, it would greatly increase the yield of and speed at which such a system could bear fruit. If at the same time there were provided a method to prevent the multiple duplication of email messages to individual recipients which characterizes the behavior of malware, it would represent a quantum leap in the effective use of email both commercially and noncommercially. If relationships could be established with these participants over time, one might create a virtual network of email clients acting as a constructive peer to peer message delivery system for any worthy purpose.

Morever such a system might have substantial political impact. Organizations that entertain and compile political input universally fall into two categories. First, there are advocacy groups which seek to get people to sign petitions dedicated to a particular proposition, the results of which are intended to be transmitted to various government officials. Second, there are independent polling companies who also determine from their end what issues they will examine and who then make the results of their polls available either publically for or privately for cost to persons interested in those results. Polling companies do not take it on themselves to transmit the results of their polls. Neither of these entity classes provides a means for allowing the people being polled to help select what questions will be asked. A referendum web site that allowed real input as to its own direction might draw more participation from both sides of the aisle, having commensurately more influence.

This disclosure teaches how to construct just such a system, with novel proposals on how to construct a form with expanded email address inputs, for coordinating the use of those email address inputs globally over a network of consenting participating email clients, for using the virtual network created thereby as a distribution platform for ongoing email promotions and solicitations, both commercial and not, and for creating at the same time a dynamic participant driven referendum entity as a new breed.

SUMMARY

The present invention is directed to fulfilling these needs. A method and system are disclosed whereby instead of single line form inputs there is provided a form textarea, into which can be pasted text containing multiple email addresses at a time as addressees for electronic messages. A further innovation is described where this textarea has the ability to itself parse its input, so that any validly formatted email addresses may be extracted by the form itself.

Morever, a method is described which allows a participant to upload a text file directly from their local hard drive, again for parsing into this input textarea. All these additional novel input mechanisms should greatly increase the chance that a willing and consenting person will input larger quantities of email addresses than would be the net outcome for the "one at a time" methods which are otherwise employed. The potential is therefore enhanced of triggering a positive feedback cascade of sent messages.

At the same, there is described herein a method of communication with a central co-ordinating server which receives, stores and tracks the email addresses which have been so input, so that new messages may be sent only to email addresses which have not received prior mailings in a particular round of a campaign, thereby modulating the cascading chain reaction, and to create a database for mailings in the future. The central server additionally may have the ability as expressly anticipated herein of transmitting additional email addresses back to the participant for consensual inclusion with the mailings they initiate at the client end, or alternatively to reduce the number of email addresses returned to a particular client based on its capabilities, returning the excess instead to another participant in a metered fashion with available capacity.

A method is provided for individuals to both opt-in and opt-out of such a system, in the case of the former providing extra features or benefits as an incentive, and in the case of the latter to allow the central server to remove from the email address streams those of any who have already declared they are not willing recipients for such transmissions. In this case the central server compares any addresses input by participants with those on the known opt-out list and returns only those which do not appear thereon for ultimate mailing.

In the case of an intangible product or free service provided we describe a web page which may derive income from either advertising, contributions or both. This web page may serve as a recurrent page to be visited by regular participants and a method is disclosed of using the growing email address database to rapidly seed further rounds of a campaign. With a relatively small core of initial participants, if each of those individuals were to be forwarded some multiple of email addresses from the master database for sending from their client end, one might create a chain reaction cascade literally overnight, modulated by the fact the central server is ensuring that only one message goes out to any particular email address.

Because in the specific implementation described herein the emails themselves are sent by the client and not the central server, the source IP address of the message is that of the client, so there is nothing recurrent for a message filter to block by way of a source address number. Of course, if that were not a concern, the central server could simply send the messages out itself using its own sendmail functions to the friends' addressees. Indeed, if we assume that many participants can be induced to provide the email addresses of friends or acquaintances, many should already be on the allowed lists in the case of email service provider schemes that discriminate by sender email address. These messages should then be allowed by the receiving system as would be any other email sent by the client with their own true email return address.

As a further novel aspect, we describe a method of using banks of synonyms to create email message body text and subject lines with unique wording patterns for each individual outgoing message, but which still read as sensible English, increasing the likelihood of them surviving hostile pattern detection algorithms. By randomly selecting a synonym from each bank, each message will have its own individual analysis signature. There is no reason why one could not maintain a rotating plurality of hyperlink urls as the same time to further reduce the chances of hitting a message filter wall looking for a particular web site domain as a flag.

Our discussion of client mail methods starts by describing a method for launching such a system without requiring asking any unusual permissions from the client operating system. In the first generation system the emails at the client end are launched by calling a "mailto" url string which automatically opens up an email message window containing the parameters of the variable in the string. Because most computer users are operating a Windows operating systems, and because the most common default email client is Outlook Express, some special provisions are described to work around the inherent limitation of this program. Outlook Express will only accept a maximum of 456 characters in such a mailto string, so we disclose a counting method to live within those boundaries.

One might also use object-based code such as ActiveX, java or some like add-on html browser component to access system functions directly at the client end, and we expressly anticipate that option. But this is a more difficult first step because the default security settings of all modern systems at least throw up warning alerts in such cases, which may put off certain potential participants. Even worse, in the case of an object not "signed as safe" or under the most conservative browser security setting, the code will simply be discarded without even a prompt to ask the client if it is interested or will consent to running the component. Nonetheless, we also describe an object-based method whereby once a certain trust level has been achieved by a particular campaign, more powerful capabilities can be provided to harness the potential of the consenting clients. It is expressly anticipated this might include the ability to distribute an outgoing mass mailing from the central server through a consenting client network to relay messages through their own internet connections.

Finally, In the context of creating a referendum-based web site, we also show how to structure a polling entity which allows the people being polled to themselves have influence on what questions they will be asked. In the detailed description we demonstrate how to integrate the process so that messages to all relevant policy makers can be submitted with one click. Further the method provides for a mechanism where they may also select who will receive the results of their input. In contrast to partisan groups who only seek to mobilize their own constituencies, we show how by positioning such an entity as nonpartisan, other groups who are advocates may be induced to compete in making their own members available as participants in our own system.

BRIEF DESCRIPTION OF THE DRAWINGS

FIG. 1 is a screen shot of sample implementation of the present invention as it might appear on an internet web page as it would be first presented to a client participant.

DETAILED DESCRIPTION

Some preliminary definitions will facilitate an understanding of the various novel aspects of the instant invention. A "networked electronic terminal" is any computer or other electronic appliance with a computer display screen, connected electronically to at least one other computer for exchange of data. A "server" is a host computer which provides contents for the display screen of the networked electronic terminal and determines thereby the functioning of those contents, and which can also receive data transmitted by the networked electronic terminal. In this context, the networked electronic terminal is known as the "client". A "participant" is anyone who uses the system to send messages or submit issue questions, also known as an "activist".

As used herein, an electronic "form" is container for code on a computer display page, which contains input elements (otherwise known as "fields") for data ("entries"), and computer control code for processing the data entered into those inputs and for transmitting that data to a receiving program called a "cgi script" accessed on a host server. The input elements can take the form of and include single line boxes, or multiple line boxes (known as "textareas"), where data may be typed in directly or have default preset values, "check boxes" and "radio buttons" where one can enter a yes/no or multiple choice answer to an option, and browsing functions where the name of a file on a local hard drive may be selected for upload back to a "target" server specified in the computer code of form. In its operation, when a form is "submitted" the values of all the form inputs associated with the names of the inputs are transmitted to the target server in a data stream, including the entire contents of any file selected by browsing.

It is the responsibility of the receiving cgi script to separate the stream back into its component parts, a process known as "parsing". Any single line of characters may represent an input data value is known as a "string". Strings can include characters which are intended as "delimiters" and which function as cutting points. In this way a collection of data inputs known as an "array" can be transformed into a string, and then later chopped back up into the original array, which forms the basis of all parsing.

In the realm of grammatically valid email addresses, protocol requires they be of the form x@y.z where x and y can be strings of characters limited to the letters of the alphabet, numbers and the symbols period ("."), dash ("-") and underscore ("_") The z string must be a one of the registered top level domain name designations such as "com", "net", etc. A client "mailing function" refers to whatever software exists on the networked electronic terminal, either already resident or independently installed, which may be used to transmit an electronic message, generally directly to a mail service provider for forwarding it to its intended ultimate destination. A "physical mailing address" as used herein is a post office mailing address for delivery of non-electronic mail, the information of which is required to determine, for example, which members of Congress represent a particular constituent user.

An "object" is an optional add-on computer code module for use in the functioning of a computer web page, which may or may not already be installed on a client system. If is it not already present, it requires the permission of the operator of the client system to be downloaded and installed, granting it control over the system level functioning of the client system which would not otherwise be available. Its available functions are then incorporated into the code of the web page. Otherwise, something on the web page will not work as intended. Such installed programs can also have the ability to function independent of the client browsing function so that they can be accessed by the central control server at its own discretion over the internet once appropriate consent is granted.

What will be described by way of a specific representative example is a web page which incorporates into its function a representative implementation of the methods of the invention. One skilled in the art will recognize that the particulars of this example in no way limit the general application of the methods described. Most of the methods illuminated herein could be applied to any manner of advertising or promotional campaigns in which an electronic messaging system has input elements. New systems of instant messaging using cell phones, and other devices in the future, can be expected to yield themselves to the basic teachings of this specification, and all such equivalent applications are explicitly reserved. Nonetheless, since the case shown here will actually be deployed shortly in the real world, the basis for its operation may be of instructive interest.

Overview of Example Web Page Functions

The example web page shown in FIG. 1, is presented as a nonpartisan political referendum web site, though it could as easily be partisan and operate in fundamentally the same manner. It should be noted, however, that one of the best reasons for casting the site as a resource, rather than an advocacy entity, is to motivate proponents of differing political positions to compete to send traffic to the site, so as to promote and advance their own agendas. There are two primary functions provided for sending email messages. First, related to the methods of the invention for sending emails to other participants, textarea 146 shows its initial state awaiting input of email addresses of possible friends or acquaintances. The contents of this input field will be used to send what we will refer to as friends' emails. There are two sub-methods provided for achieving this input, a participant may either paste in raw text directly, or with the browse button 152, they may browse to select a text file from their local hard drive, the name of which then becomes the input value form input 150, whereupon the file it points to is further processed to populate textarea 146.

As its second primary functions, this particular web page offers to facilitate the transmission of emails to members of Congress. Here, inputs 136, 138 and 140 of FIG. 1 will receive the names of particular legislative representative corresponding to the address of the participant. There are "position inputs" which allow a participant to declare their general position on a particular political question by selection of a radio button 110, and to add personal comments by way of a message in a second textarea box, 130. The other fields of the form provide name, address and phone number information for transmission with their message to Congress, using inputs 112, 114, 116, 118, 120, 122, 124, 126, and 128. In addition, there is a text area 156 for choosing from a selection of possible next primary questions to vote for with button 158, and an input function 160 which allows a participant to propose their own question.

The Sending of Friends Emails

When a participant pastes any text directly into textarea 146 of FIG. 1, the method of the invention parses it to extract any properly formatted email addresses. One skilled in the art will already know multiple ways of doing such an extraction using javascript, for example, a line such as emailArray=inputField.match(/([a-zA-Z0-9._-]+@[a-zA-Z0-9._-]+/.com)/);

will load into the variable emailArray, from the string "inputField", all available email addresses of the form x@y.com, where x and y are strings using characters which might appear in a protocol consistent email address. As soon as the participant clicks anywhere else on the page, the method of this invention in this case uses an onBlur javascript function call to do the extraction, eliminate duplicates to the array, and the rewrites the input field value 146 of FIG. 1 with the extracted values ready for submission with the form.

This is a great improvement over existing methods which require a person to input one email address at a time into individual input fields, or add particular required punctuation breaks, as seen anywhere else. The old method requires multiple tedious copying and pasting operations which can only act to discourage the input of multiple entries. By contrast this new method makes it easier for a person to load in their entire mailing list if they are motivated to do that. Because the particular nature of this web page is an invitation for participants to have political influence, this is an especially good example of a situation where a person might desire and consent do just such a thing, but many other motivating scenarios are anticipated. For example, a person might be otherwise compensated, given free passes or discounts in exchange for providing email addresses in such a way and then transmitting the messages themselves as described herein.

The method of the invention in this specific implementation further demonstrates in this example the innovation of accepting raw files for input using the file browser form input field 152 of FIG. 1. There is an inherent browser security issue related to opening and reading a local file with the browser itself from a web page. One may do so directly, but only in Internet Explorer and then only if an ActiveX shell function is authorized, or if some other authorized object component is downloaded and installed. Instead, using the method of this invention input field 150 resides here in its own form element on the page. When the participant, 404 of FIG. 4, selects the name of a file by browsing with button 152 of FIG. 1, and then clicks anywhere else on the page, a javascript onBlur call causes the form to auto-submit. This immediately transfers the file to a waiting cgi receptor script which resides on the central server, 408 of FIG. 4. The output from the server back to client 404 is targeted to a hidden (and not shown for that reason in FIG. 1) frame of the web page. The fact that this submission may take place immediately upon selection is fully disclosed in the terms and conditions link 108 of FIG. 1 which is prominently displayed in at the top of the web page.

There is a very practical reason besides the browser security model why this is a favored and justifiable method. While relatively small lists of email addresses, perhaps as many as a couple hundred, may be sorted for duplicates using browser javascript code, inputs of very large lists will cause a browser to run slow or even crash because of processing overloads, javascript being a relatively high level and processor intensive language to compile and process at runtime. By transmitting the input file immediately to the server 408 of FIG. 4, it can be far more efficiently processed for duplicates there and the result can be returned as source html code for the hidden frame. By returning the result as a javascript variable value to the client participant, 404 of FIG. 4, with an onLoad self executing function directive, the frame can then automatically load the result back up into textarea 146 of FIG. 1 in a manner totally transparent to the client participant. Of course, this will only work if the root domain of the web page in the visible frame and the root domain of the cgi script output for the hidden frame is the same, the so-called browser cross site scripting limitation. This is not a problem here because the choice of domains as source for the hidden frame is written into the code of the visible frame itself at its own discretion.

Figure 4:
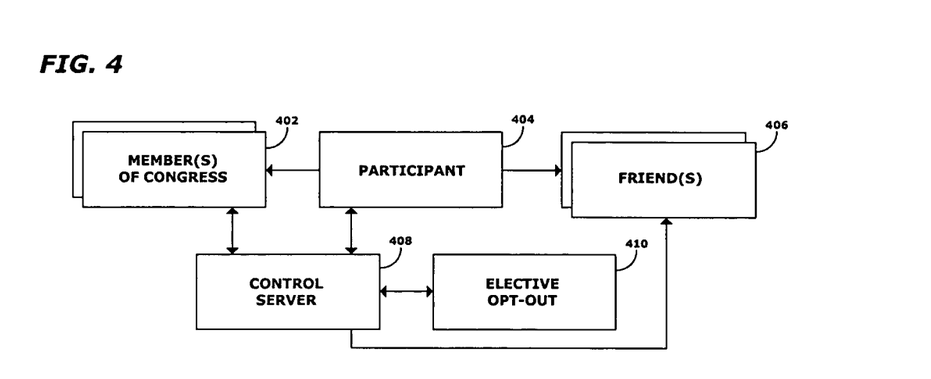
FIG. 4 is block diagram of the relationships and contacts which the present invention encompasses in accordance with a specific embodiment.

In a like manner, the method of this invention in this specific implementation can also send the extracted values of the emailArray variable as a comma delimited string directly to the server 408 of FIG. 4 if it exceeds a certain size number, again avoiding the processor intensive search for duplicates at the client browser level. Here it is simply a matter of setting a hidden input value of the form which also contains browse button 152 and input field 150 of FIG. 1 with the value of the emailArray string, and then again auto-submitting in the same way. The receiving cgi script receives the value of string, parses it back to its original array values, and then processes it as above, again entirely transparently.

If it is not necessary to return data to the client form such a transfer can be done without using a subordinate frame by creating a javascript image object and calling a cgi-script to load it with a source image file. The image returned can even carry back a small amount of data contained in its dimensions, but there is no limit on the quantity of data that can be sent to the target using this method. One skilled in the art would recognize javascript to perform this function in the following form:

transfer=new Image( );

transfer.src=http://targetserver/uploadScript.cgi?value=data

Figure 3:
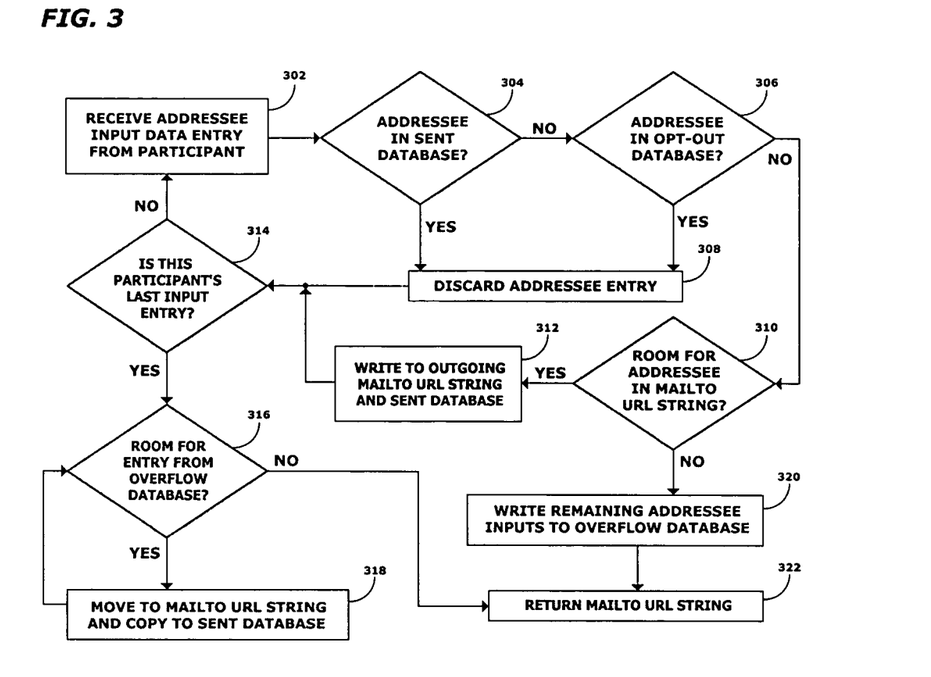
FIG. 3 is a flow diagram illustrating the steps executed in processing recipient address information from a client and returning data for generating an email message to be sent by the client.

Still talking only about the first primary function of this particular example web page, the incoming email addresses submitted by the participant, 302 of FIG. 3, will be incorporated into an email message sent to those email addresses either as the "To:" recipient or as additional CCs. The only way to do this at the client end without requesting special browser permissions or installing additional software is to use the mailto directive. In javascript one can construct a mailto url of the form:

mailto:
email1@domain1.com?subject=subjectLine&body=message&cc=ccArray

Here the ccArray can be a string of any number of comma delimited email addresses. In this case, email1@domain1.com is the primary recipient, the "To:" addressee. The mailto url can then be assigned as the href content of a new target window opened by javascript or, in all browsers but Internet Explorer, it may be set as action variable of a form, and as before the form can be commanded to auto-submit. Either way this opens up an email message window, 202 of FIG. 2, in the browser using the default mailto program.

Figure 2:
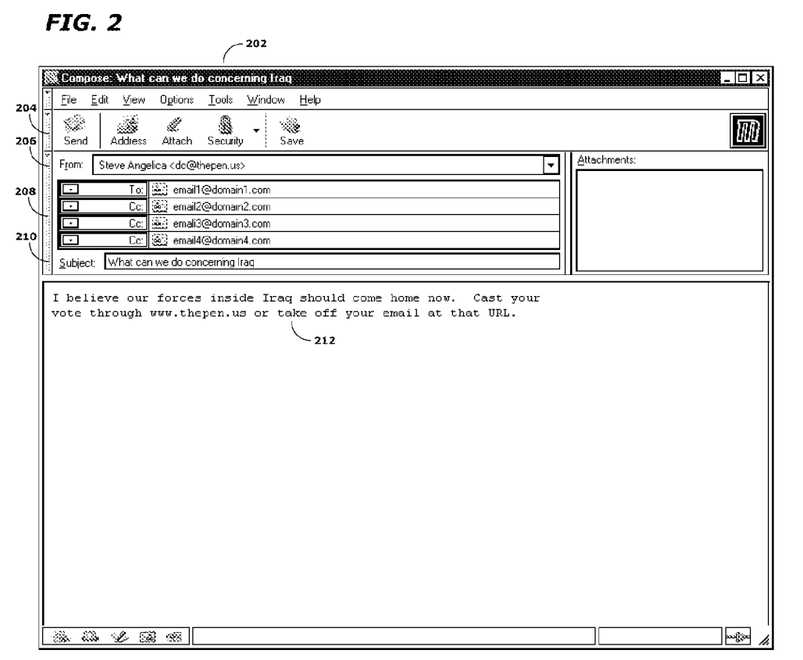
FIG. 2 is a screen shot of short sample email ready to be transmitted that might appear on the client display in response to a javascript call to the client mailto function.

The message is not actually sent in this specific implementation until the participant affirmatively clicks on the send button 204 of the email message, which transmits the message to the friends' addressees, 406 of FIG. 4. But the whole process only requires a total of two clicks from the participant, one to do the main form submission itself on the page, and the second to confirm and send the fully prepared message as formatted by the method of this system. If there were to be a consensual mailing function program installed at the client end this could be done with one click alone. FIG. 2 shows an example of a message so pre-formatted ready for client sending where it is desired to provide an option for the client to specifically affirm. When received by the addressee the url "www.thepen.us" will appear as a clickable hyperlink. As previously noted, if there were no deliberate requirement that the message should carry the source IP address of the participant, 404 of FIG. 4, the central server 408 could just as well transmit the messages directly to the friends' addressees 406, not requiring a client mailing function.

For all email clients except for Outlook Express there appears to be no unreasonable limit on the length of the mailto url string. For Outlook Express only the string can have no more than 456 characters, or else the application throws an error message which doesn't even suggest its actual cause. Budgeting for a relatively short subject line, 210 of FIG. 2, and a short but effective message body 212 leave a remaining available character count perhaps enough for about 10 average email addresses to be used as a "To:" address and CCs, 208. If an Outlook Express user submits more email addresses than can be accommodated in the 456 characters of the mailto url string, 310 of FIG. 3, or if another user submits a list over a certain predetermined number, following the method of the invention in this specific example the central server places these in an overflow holding list at 320 of FIG. 3, to be added as extra CCs with the consent of another participant, at 316 and 318.

Check box 148 of FIG. 1, if left checked constitutes legal permission to add extra CCs to a participant's outgoing friends' emails as fully disclosed in the terms and conditions already referred to above. In this way the central server, 408 of FIG. 4, can act as load balancer, temporarily holding in reserve excess emails from some participants and adding them to the messages of others. The central server counts the length of each the mailto url string as it is being created to know when the 456 character limit is reached, or simply chooses a cutoff point for other email clients, 310 of FIG. 3. A reasonable limit would be in the range of 10-25 CCs per message, as any larger number than that is likely to trigger more message filters anyway. If each participant were to send along just 10 CCs with every message, either provided by himself or fed by the central server, it is reasonable to anticipate the creation of a positive feedback chain reaction in cyberspace. After processing all inputs at 314, if there is additional room at 316, addressee entries are drawn from the overflow database at 318, and transferred also to the sent database with the assumption they are going out, and then the mailto url string is returned to the client participant, 404 of FIG. 4, at 322 of FIG. 3. Where other mailing functions besides the mailto directive are used there are no such character limits need to be provided for, and emails can be sent to individual recipients or grouped with quantities of CCs as desired.

This leads us to another important method of the invention in this specific context, some mechanism to modulate the potential cascading chain reaction. The problem is simply expressed as preventing multiple messages from being sent to the same recipient in any particular round of a campaign. Here the server 408 of FIG. 4 acts as a governing filter. All email addresses which are contained in a mailto url string returned to a client participant 404 (or sent by the server itself directly) are also stored in a directory tree of emails sent by email address name at 312 of FIG. 3. If an address submitted already appears in the sent database, at 304, it can be dropped at 308.

One method for doing so might be to open a file, write to it all email addresses sent, read it, search it, and then doing comparisons to remove corresponding incoming email addresses sent by the client in composing the next mailto url string. One skilled in the art might indeed employ such a method. However, we decided to instead create in this specific implementation a sent database in the form of a directory tree, with folder names derived from the first three characters of each email address, and then writing a short file for each email sent in the folder it corresponds to. This amounts to 64,000 mathematical possibilities of folder names with all available legal email characters, but in the world of real mail email addresses is a reasonably smaller number. Such a tree can be rapidly searched with a perl (cgi script native server language) conditional directive such as if (-e $emailFileName)

to see if the file exists without even opening a file handle. For a system anticipating heavy load efficiency was placed at a premium. This also ameliorates issues with file locking when multiple child processes are active on a server. The files themselves could hold the contents of the message sent in the case of the original participant, including their name and address information, etc. Since no email address is included in a message to be sent out unless affirmatively formatted by the central server, this should act as a failsafe to the runaway mailbox duplication effect.

Since we may be asking participants to accept recipient email addressees they may not know personally, we thought it desirable in this specific implementation to match them as best as possible by political position. Here the answer to question at issue, chosen amongst radio buttons 110 of FIG. 1, has three options, though any modest number might be chosen. Therefore, the method of this invention in this specific implementation maintains three folders of excess submitted emails sorted by the submitting participant's own answer, which are then drawn from depending on the answer of another participant with available mailto url string character capacity. When an email address in an overflow holding folder is consumed at 318 of FIG. 3 that file name is deleted from the holding directory and a corresponding one is written in the sent database directory tree. In effect, if a particular CC is sent by a participant other than the original submitter, the content of the message is functionally the same as it would have been otherwise.

The method of the invention in this specific implementation includes a method both to opt-in and to opt-out, shown as links 104 and 106 of FIG. 1. It is important to provide a method to opt-out for legal and ethical reasons. The outgoing friends' message also advises that an opt-out link is available at the main site home page, as shown in 212 of FIG. 2. Clicking on either of these links can cause a verification email to be sent to the requester 410 of FIG. 4 with an encrypted variable value in the query string for the link back. When the requester verifies their control of the email address by replying to the verification email, the central server, 408 of FIG. 4, writes their email address in the sent directory tree and notes them as a permanent opt-out, in this case by setting an otherwise unused file mode bit. In this way if another participant submits them later as a friend's email address, they can be filtered out as if they had already been mailed, at 306 of FIG. 3. All prior opt-outs can be pre-loaded into the sent directory tree of any new round of a campaign for this same purpose.

Following the method of this specific example, each incoming participant has his own email address checked against the sent directory tree to see if the opt-out file mode bit is set. If so, the central server, 408 of FIG. 4, can respond by returning a page that alerts the participant that he is an elective opt-out 410 and inviting him to reverse his status by the opt-in procedure. Upon completing the opt-in procedure the opt-out file mode bit is cleared and the block is thereby removed. An option can also be provided for a participant to remove an old address and simultaneously opt-in with a new one.

In application of the first primary method, it is not necessary or perhaps even desirable to use the names and actual mailing addresses of the participant senders for the purpose of the friends' emails, except as their email addresses are already disclosed by their own email clients, though for people that already know each other including a first and a last name is more personal. Where messages may be sent to people they don't know in the load balancing process, this is again fully disclosed and we have seen there is an option check box, 148 of FIG. 1, to decline from this extra feature in any case.

As a further means of avoiding problems with certain message filters we disclose as a method of the invention using banks of synonyms to compose each outgoing message body and subject line. This will be easily understood by one skilled in the art. With respect to the specific example given, if the person indicated their preference that the troop levels in Iraq should remain the same, this might be represented by a statement derived from the following matrix:

Where it is left in their final control, if the participant for some reason in this specific implementation does not proceed in sending the message, there will be a loss factor, as the central server, 408 of FIG. 4, will assume those people were in fact emailed. Once again, this consideration is moot where the central control server is the message sender directly or through a client installed program granting consent to the server. Otherwise we must provide sufficient motivation to minimize this loss factor, here in part by surmising that the participant is moved to promote their political position. In other possible examples, suppose one was promoting a movie or a concert. One might offer a free pass if a participant would agree to send emails to a certain number of friends. If one friend has a ticket, the others will want to go. All such possibilities are explicitly envisaged by the method of this invention, including but not limited to offering some participant discounts, or any other kind of reward or incentive. As a last resort one might increase the per person limit to multiple soliciting emails per campaign without creating unnecessary ire if the campaigns themselves were not too closely spaced.

As a further method of the invention we disclose a method of using extra permission objects to more effectively send out email using the system described herein. We must assume that a particular promotional project has evolved to the point where there is some trust built up. One of the best examples of how this can happen is how the Flash code object has proliferated. If one encounters a web page including a Flash animation object tag and the browser lacks the necessary component object, one is solicited to download and install automatically a software cabinet file which then has system level permission to configure whatever the Flash company programmers have predetermined. The Flash object is a fully cross browser solution, though similar things can be done with ActiveX objects for Internet Explorer for Windows only, where a relative small enabling component file can be downloaded and installed while still on a web page which might require it.

| I think | our | forces | in Iraq | should | come home |
| I believe | US | troops | to Iraq | must | come home now |
| I say | U.S. | troop numbers | for Iraq | ought to | return home |
| I vote that | the US | troop levels | within Iraq | have to | return home now |
| My view is | the U.S. | armed forces | inside Iraq | | decrease |
| My opinion is | our US | soldiers | | | |
| | our U.S. | | | | |

Picking at random one phrasing from each column yields more than 25,000 possible wordings from just this simple example, all acceptable English sentences, and that's just for the first answer selection. Any text could be similarly expanded into synonym options as demonstrated here and randomized without affecting its essential content. Such a passage may be seen as part of the message body, 210 of FIG. 2, the rest of which was also generated by the same protocol in this case.

Concluding the description of the first primary function of the sample web page, a subject line is generated by the central server, in the same way as was the message body, and using the other filtered email address elements, 208 of FIG. 2, a fully constructed mailto url string is returned to the client participant, 404 of FIG. 4, in the same hidden frame. As shown above the javascript directives already described may use that variable value to open a message window with all fields filed in ready for the client to send. The participant has an opportunity here to review the outgoing message before sending it and this phase is done.

As previously suggested one skilled in the art might easily construct an installable software component object with the limited function of accessing the default or installed client mail program and causing it to send out any number of emails in the background converting the system into a pure one click solution. The first participants to install such software might be induced to do so by the offer of access to special extra features of the web page, additional software functions like database organizing or conferencing capabilities, the convenience of one click operation, or free passes, discounts, etc. With an already installed base of client machines containing software the equivalent of resident SMTP engines, again with fully forthcoming disclosure and consent, an email campaign might be launched even more effectively, either synchronous with a participant submission or at successive times under control of and at the discretion of the central control server.

It would be critical to ensure that such a software component detect the source IP address of any web page it appeared on in an object tag or to exchange some kind of coded handshake with an authorized server. This is necessary to preclude the possibility of unauthorized web sites or servers exploiting what would amount to an email client back door mailing function. This second generation model is a step of great responsibility to be taken carefully, much as any other software object component is certified by its distributor as being "safe for scripting". The primary driving factor toward the second generation model is that there is no other way than with expanded security permissions to generate longer messages at the client end with Internet Explorer and Outlook Express, which is the default mailto configuration on so many machines.

The Sending of Policy Maker Messages

The operation of the second primary function of the example web page itself has numerous novel aspects. For example, unlike other organizations where the actual questions at issue are solely predetermined, there is a textarea, 156 of FIG. 1, where participants can indicate their preference as to what primary question should be next considered, and "on deck" circle so to speak, and then cast a vote for their preference with button 158. Moreover, participants are given the opportunity by an email link 160 to propose their own questions. In this way, a participant may see an issue of interest to him floated as a possible future question and then graduate by the votes of other participants to the primary periodic question of interest. This opens the door in a major way to motivating other organizations to harness the web page for their own advocacy. As a further anticipated option certain activists may be given the ability to submit their own questions directly and generate corresponding action pages they can use immediately for their own mobilization purposes, which might well be strictly partisan, in which case the action page would be in the form of a petition with the vote preselected rather than an open voting referendum. An option can be provided to include a prepared position statement as the default value one of the input elements, but one experienced in this matters will know that personal comments are more likely to have an impact on the recipient policy makers.

Participants might naturally be interested in how the vote counts are going on an issue of concern, or even read the comments of others. It would be desirable to make a function available to display such information, which could easily be formatted from the data stream stored from the submissions of the participants. One possible format would be to display a reasonable number of the most recent submissions using a last in first out protocol, which would also enable a participant to confirm that his own message had been properly logged.

At the same time, participants can know that they are not just taking a meaningless straw poll. They have to opportunity to determine for themselves which members of Congress will receive their message, using check boxes 134, 138, and 142 of FIG. 1. This could easily be expanding into a much wider range of government officials, agency administrators, business leaders, media outlets, etc. So while the specific implementation examined here speaks of members of Congress, application to all other types of influential leaders is expressly anticipated and reserved. All of these factors engender greater involvement and participation, increasing thereby the political clout of the participant individuals. If an entity is perceived as effective in mobilizing voter participation, it will be taken seriously by those in government or business, resulting in even more participation, another positive feedback effect.

In its mechanical operation with regards to transmitting the voting information to Congress, the full nine digit zip code of the participant, 118 of FIG. 1, is looked up automatically by their address inputs, 122, 124, and 126, if only the five digit value is provided, and then the full zip code is used to determine the corresponding members of Congress, inputs 136, 140 and 144, for that address. In other contexts such as state legislatures, media outlets by territory and the like, it is a simple matter of indexing a corresponding database to the zip code values. Using the method of the invention, the address data is transmitted by the client participant, 404 of FIG. 4, to another cgi script on the central server 408, which looks up the information in databases readily available for this purpose. If it is desired to return these values to the participant 404 in the original form, the hidden frame mechanism previously disclosed can be targeted to include javascript which executes onLoad to deliver the resultant information to the correct input form fields of the visible frame.

If all that needs to be returned is identification of the members of Congress, an index number (in this case in the range of 500 numbers) can be returned derived from the dimensions of a javascript image object as discussed above without utilizing a subordinate frame or loading a new page. Doing a full address to zip code to house representative lookup would require gigabytes of searchable database, generally requiring the computing and storage power of the central control server. But once reduced to an index number, a list of all members of Congress including their phone and fax numbers or other interesting information can be included in the javascript code source of the web page with as little as 20-30 kilobytes of data in the initial page load. As an additional example, a freestanding instant phone number lookup function could provide the contact phone numbers for communicating messages to members of Congress based on one's street address, in which case the position inputs would by phone call or fax. The returned index number can be used by javascript control code to select the data to be loaded back into inputs 136, 140 and 144 or any other input element on the page. Using the same variable names as the javascript image object example above, a typical index number derivation method based on the dimensions of an image source load could be something of the form:

$$\text{indexNumber}=(((+\text{transfer.width})-1)*20)+ \\ (+\text{transfer.height})-1;$$

Once all the information is available in the input form fields, the main form itself may be submitted, which is also when the central server, 408 of FIG. 4, formats and returns the mailto url string as previously described to the client participant 404, or else sends the additional friends emails out itself. At this time also, depending on which of the check boxes 134, 138, and 142 of FIG. 1 are checked, calls are made to cgi scripts for up to additional hidden frames for each member of Congress. A different frame is used for each member of Congress because they may use a variety of different access points and qualifying forms for their incoming email functions. Many have a series of forms that must be submitted in succession before a message is finally accepted for delivery. A substantial number, especially in the House of Representatives, no longer publish a freestanding email address for direct addressing purposes.

When the central server, 408 of FIG. 4, receives these three additional cgi form submissions, it uses the submitted client name and address information to run the gauntlet of required form submissions for each respective particular member of Congress 402, fetching and parsing each return page on behalf of the participant and submitting whatever information is required at each stage. The final form ready for submission is then returned as a self-submitting form page to the participant client 404 in one of the respective hidden frames prepared for it, again accomplished with an onLoad directive commanding the fully populated form to submit itself. The net result of all this is that just as with the outgoing friends' emails, the final form submissions for the members of Congress will also carry the IP address of the participant as opposed to the central server which is as it should optimally be. As before, the central control server has the option of sending the emails to the policy maker recipients directly itself. There may be situations where a policy maker has neither an input internet form nor a publicly accessible email address. In such cases the central control server may also transmit fax messages by voice over IP internet connection or even log data for manual mailing in extreme situations. The server can also provide all such services for other web sites in the background.

As a further anticipated innovation one could incorporate the submission form into a soliciting email itself rather than just providing a link to an action page on a another web site. There is a loss of yield factor associated with every click a participant is asked to perform to complete the process as they might get distracted, waylaid or otherwise not follow through. Email messages can include not just simple text but also html web code much like that of web pages themselves. One skilled in the art could construct a form as described above with the action target in the form tag being an email address as demonstrated by the following:

action="mailto:submissions@thepen.us?subject=
No_on_HR685&cc=backup@other.com"

In this case the form data information is transmitted to the central control server by email protocol where it can be parsed and processed in the same way as previous examples. One of the really nice features of the email protocol is a sending mail server will try repeatedly over a number of days to deliver a message until its receipt is confirmed. But the additional CC address provides redundancy for reliability, as where the primary target email might be disabled for some reason. A minority of email clients may not transmit the complete contents of the form in actual practice, but this can be compensated for by instructing in the original email to make sure the address information is included and by following up on any incomplete submissions. At the very least one is able by this method to engage new activists and acquire their email contact addresses for subsequent action alert mailings.

Security Issues and Code Protection

What would happen if the servers on Capitol Hill were flooded with messages from their constituents? A fair way to frame this question would be to ask, "Is too much democracy a bad thing?" Are the people raising up their own voices to speak out to be construed as a denial of service attack? Some members of Congress now plead for more of their constituents to write them so as to demonstrate that there is support for the positions they advocate. If any member of Congress might object to the volume of messages coming in via this system vis-a-vis their own capacity, there is no reason why an arrangement could not be made to transfer the data to them in discreet file form, compiled or not. Our system would then simply be extending its role as an honest broker, and even casual random spot checking should confirm than these are real people seeking to communicate their own personal opinions.

In practical application the central server may apply numerous security safeguards to guard against spurious or robotic input. All cgi script accesses can be checked to see if they carry an http referrer header which matches a numerical IP used by the control server for one of its pages, though this can be faked. The source numerical IPs of the page requests, much more difficult to forge, can be examined to see if they are originating through proxies. While it is relative easy to find an open proxy for the purposes of anonymity, no such proxy server bothers populating all the standard browser request headers that a true workstation client access would carry, making their absence a simple indicator. In addition, any IPs generating unusual volumes may be probed on the fly using reverse DNS to determine if they are coming from foreign top level domains, another red flag of proxy usage.

The system can track who has sent a message to a particular member of Congress on the question at issue, by setting another otherwise unused file mode bit on the file for their email address name in the sent directory. This should prevent anyone from voting twice using the same email address. Finally, where the emails and the final form submissions sent to Congressional gateways are being sent by the clients themselves, these accesses would all be traceable back to the original sender. There would simply be nothing to be gained by an attempt to pack the vote through this system as it would be just as detectable with or without our system. Moreover, statistical analysis of the system logs looking for unusual activity, comparison of addresses submitted to the actual geographic location of the IP source addresses used, and other forms of pattern detection, should detect any aberrations otherwise not caught.

We can also encrypt critical portions of the javascript enabling code in its deployment. Included in such sections would be code to cause the functions to abort if installed on a page of another web site. This will hopefully discourage what are commonly known as "script kiddies" from trying to use the code of this system for their own un-welcomed purpose. Of course, major sections of the enabling code would be found only at the system level of the central server, and not exposed directly to the outside except for the ultimate output product of the scripts. So acquiring that machinery would either require a hostile hack into the server, or else a person would have to already be one skilled in the art with access to the teachings of this patent application, subject to infringement of course.

Final Considerations

In the broader sense, one skilled in the art would acknowledge that the methods taught herein may be applied to any electronic messaging system in the future which has the capacity of receiving as input the messaging address of a participant or friend. All the features disclosed in this specification (including any accompanying claims, abstract and drawings) may be replaced by alternative features serving the same, equivalent or similar purpose, unless expressly stated otherwise. It is expressly understood that each feature disclosed is one example only of a generic series of equivalent or similar features. Any element in a claim that does not explicitly state "means for" performing a specified function, or "step for" performing a specific function, is not to be interpreted as a "means" or "step" clause as specified in 35 U.S.C. §112, ¶6. In particular, the use of "step of" in the claims is not intended to invoke the provisions of 35 U.S.C. §112.

What we have accomplished here with the second primary function of the sample site is to entirely automate the process of communication between their constituents and members of Congress. The alternative would be for a participant to go out to each of the respective Congressional web sites, figure out what kind of submission vehicle they are using, find the right page, perhaps be required to conduct a separate search to determine their full nine digit plus4 zip code, then fill in and submit as many as four forms in succession for a particular member of Congress, a potentially tedious routine. Utilizing the methods described herein, this process can be completed with one click by the participant. It is hoped that the simplicity of the system, which has served as a specific example of the method of the invention, will result in our members of Congress getting increased feed back from their constituents.

It is also hoped that those same members of Congress will welcome and appreciate hearing from more of their people. It is also hoped that the web site of this particular site may be supported with donations and/or the sale of "premiums", merchandise with a donation portion built into its price, although a standard advertising supported model is not out of the question. It is hoped.

The invention claimed is:

1. A method of conducting a referendum on a computer network comprising the steps of:
    (a) hosting on a computer server a first plurality of questions at issue;
    (b) the computer server receiving with one click from each of a first plurality of activists their address information to be selected from the group consisting of
        (1) their nine digit zip code information, or
        (2) address information sufficient to look up their nine digit zip code information, whereupon the computer server performs the step of looking up their nine digit zip code information;
    (c) the computer server associating the nine digit zip code information of the said activists with their representative policy makers having influence over deciding the said questions at issue;
    (d) the computer server transmitting a plurality of position inputs of the said activists as to the said questions at issue to those said policy makers.

2. The method of claim 1, where the computer server further receives from a particular one of the first plurality of activists of 1(b) their recipient inputs to select which of the said policy makers of 1(c) are to receive the position inputs of that activist.

3. The method of claim 1, further comprising adding a second plurality of questions at issue to the selection of the first plurality of questions of 1(a), based on a referendum of a second plurality of activists.

4. The method of claim 3, where one of the second plurality of activists can on their own initiative add a question directly to the first plurality of questions at issue of 1(a).

5. The method of claim 1, further comprising making available in a publicly accessible form a compilation of the positions inputs of 1(d), where one of the first plurality of activists can access the positions inputs of others of the first plurality of activists.

6. The method of claim 1, wherein the position inputs of 1(d) are transmitted to a third plurality of potential activists to stimulate their interest in joining the first plurality of activists.

7. The method of claim 1, further comprising:
    (a) determining a source electronic IP address for the first plurality of activists of 1(b)
    (b) checking the source electronic IP address of the first plurality of activists of 1(b) against a plurality of databases of exclusion parameters.

8. The method of claim 7, wherein statistical analysis is performed on the source electronic IP address of the first plurality of activists to exclude unusual activity.

9. The method of claim 1, further comprising:
    (a) storing the first plurality of activists in a third stored database;
    (b) comparing each successive one of the first plurality of activists against the third stored database to preclude the first plurality of activists from transmitting more than once each on a particular question at issue.

10. The method of claim 1, further comprising increasing participation by having the first plurality of activists compete to influence the result of one of the first plurality of questions at issue with voting choices.

11. An apparatus for conducting a referendum comprising:
    (a) a computer server with means for hosting a first plurality of questions at issue;
    (b) means for a first plurality of activists to access the server hosting the first plurality of questions at issue;
    (c) means for the computer server to receive with one click from each of the first plurality of activists their address information to be selected from the group consisting of
        (1) their nine digit zip code information, or
        (2) address information sufficient to look up their nine digit zip code information, whereupon the computer server performs the step of looking up their nine digit zip code information;
    (d) means for the computer server to associate the [physical mailing address] nine digit zip code information of the said activists with their representative policy makers having influence over deciding the said questions at issue;
    (e) means for the computer server to transmit a plurality of position inputs of the said activists as to the said questions at issue to those said policy makers.

12. The apparatus of claim 11, with means whereby the computer server further receives from a particular one of the first plurality of activists of 11(b) their recipient inputs to select which of the said policy makers of 11(d) are to receive the position inputs of that activist.

13. The apparatus of claim 11, further comprising means for adding a second plurality of questions at issue to the selection of the first plurality of questions 11 (a), based on a referendum of a second plurality of activists.

14. The apparatus of claim 13, with means whereby one of the second plurality of activists can on their own initiative add a question directly to the first plurality of questions at issue of 11(a).

15. The apparatus of claim 11, further comprising means for making available in a publicly accessible form a compilation of the positions inputs of 11(e), where one of the first plurality of activists can access the positions inputs of others of the first plurality of activists.

16. The apparatus of claim 11, with means whereby the position inputs of 11(e) are transmitted to a third plurality of potential activists to stimulate their interest in joining the first plurality of activists.

17. The apparatus of claim 11, further comprising:
    (a) means for determining a source electronic IP address for the first plurality of activists of 11(b)
    (b) means for checking the source electronic IP address of the first plurality of activists of 11(b) against a plurality of databases of exclusion parameters.

18. The apparatus of claim 17, with means whereby statistical analysis is performed on the source electronic IP address of the first plurality of activists to exclude unusual activity.

19. The apparatus of claim 11, further comprising:
    (a) means for storing the first plurality of activists in a third stored database;
    (b) means for comparing each successive one of the plurality of activists against the third stored database to preclude the first plurality of activists from transmitting more than once each on a particular question at issue.

20. The apparatus of claim 11, further comprising means for increasing participation by having the first plurality of activists compete to influence the result of one of the first plurality of question at issue with voting choices.

* * * * *